US008329294B2

(12) United States Patent
Ishida et al.

(10) Patent No.: US 8,329,294 B2
(45) Date of Patent: Dec. 11, 2012

(54) STYRENE-MODIFIED POLYPROPYLENE TYPE RESIN PARTICLE, FOAMABLE STYRENE-MODIFIED POLYPROPYLENE TYPE RESIN PARTICLE, STYRENE-MODIFIED POLYPROPYLENE TYPE RESIN FOAMED PARTICLE, STYRENE-MODIFIED POLYPROPYLENE TYPE RESIN FOAMED MOLDED PRODUCT, AND PRODUCTION METHODS THEREOF

(75) Inventors: Shinji Ishida, Ritto (JP); Masahiko Ozawa, Koka (JP)

(73) Assignee: Sekisui Plastics Co., Ltd., Osaka (JP)

( * ) Notice: Subject to any disclaimer, the term of this patent is extended or adjusted under 35 U.S.C. 154(b) by 4 days.

(21) Appl. No.: 12/224,372

(22) PCT Filed: Feb. 21, 2007

(86) PCT No.: PCT/JP2007/053193
§ 371 (c)(1),
(2), (4) Date: Aug. 26, 2008

(87) PCT Pub. No.: WO2007/099833
PCT Pub. Date: Sep. 7, 2007

(65) Prior Publication Data
US 2009/0274890 A1 Nov. 5, 2009

(30) Foreign Application Priority Data
Feb. 28, 2006 (JP) ................................ 2006-052110

(51) Int. Cl.
*B32B 5/16* (2006.01)
*C08J 9/18* (2006.01)
*B29C 44/44* (2006.01)

(52) U.S. Cl. ....... 428/402; 428/304.4; 521/56; 521/146; 264/51

(58) Field of Classification Search ............... 428/317.9, 428/313.5, 402, 407; 521/56, 146; 264/51
See application file for complete search history.

(56) References Cited

U.S. PATENT DOCUMENTS

| 4,097,554 A | * | 6/1978 | Yui et al. ........................ 525/93 |
| 4,698,191 A | * | 10/1987 | Endo et al. ..................... 264/50 |
| 5,300,578 A | * | 4/1994 | Vestberg et al. ............... 525/252 |
| 5,489,648 A | | 2/1996 | Okimura et al. |
| 7,579,384 B2 | * | 8/2009 | Matsumura et al. ............ 521/56 |

(Continued)

FOREIGN PATENT DOCUMENTS
EP 06-32070 A1 1/1995
(Continued)

OTHER PUBLICATIONS
Translation of JP 2001-302837, Sasaki et al., "Foamed Particle for Molding", Oct. 31, 2001.*

(Continued)

*Primary Examiner* — Hai Vo
(74) *Attorney, Agent, or Firm* — Rader Fishman & Grauer, PLLC (57) ABSTRACT

A styrene-modified polypropylene type resin particle of the present invention includes: a polypropylene type resin and a polystyrene type resin, wherein the polystyrene type resin is included at 30 parts by weight or more but less than 600 parts by weight per 100 parts by weight of the polypropylene type resin, and polystyrene type resin particles having a longitudinal diameter of 5 μm or less are dispersed in the polypropylene type resin.

13 Claims, 2 Drawing Sheets

U.S. PATENT DOCUMENTS

| | | |
|---|---|---|
| 2006/0038311 A1* | 2/2006 | Togou et al. .................... 264/51 |
| 2006/0058406 A1* | 3/2006 | Matsumura et al. .......... 521/142 |

FOREIGN PATENT DOCUMENTS

| | | |
|---|---|---|
| EP | 1 612 239 A1 | 1/2006 |
| JP | 61-9432 | 1/1986 |
| JP | 61-012736 | 1/1986 |
| JP | 05-262810 | 10/1993 |
| JP | 06-345828 | 12/1994 |
| JP | 09-194623 | 7/1997 |
| JP | 11-12382 | 1/1999 |
| JP | 2000-319439 | 11/2000 |
| JP | 2001-302837 | 10/2001 |
| JP | 2002-145967 | 5/2002 |
| JP | 2004-142260 | 5/2004 |
| JP | 2005-097555 A | 4/2005 |
| JP | 2005-111888 A | 4/2005 |
| JP | 2005-281595 | 10/2005 |
| JP | 2006-83221 | 3/2006 |
| TW | 448188 | 8/2001 |
| WO | WO 2004085528 A1 * | 10/2004 |
| WO | WO 2004090029 A1 * | 10/2004 |
| WO | WO-2006/027944 A1 | 3/2006 |
| WO | WO 2006033449 A1 * | 3/2006 |

OTHER PUBLICATIONS

Extended European Search Report dated Aug. 19, 2010 for corresponding European Application No. 07 71 4693.

English Language Translation of Taiwanese Office Action issued Mar. 11, 2011 for corresponding Taiwanese Application No. 096106496.

* cited by examiner

FIG. 1 ous suspension to at least a temperature at which the crystalline portion of the polypropylene (a) begins to melt substantially, thereby polymerizing the vinyl type monomer component (b).

STYRENE-MODIFIED POLYPROPYLENE TYPE RESIN PARTICLE, FOAMABLE STYRENE-MODIFIED POLYPROPYLENE TYPE RESIN PARTICLE, STYRENE-MODIFIED POLYPROPYLENE TYPE RESIN FOAMED PARTICLE, STYRENE-MODIFIED POLYPROPYLENE TYPE RESIN FOAMED MOLDED PRODUCT, AND PRODUCTION METHODS THEREOF

TECHNICAL FIELD

The present invention relates to a styrene-modified polypropylene type resin particle obtained by polymerizing styrene with a polypropylene type resin as a nucleus, a styrene-modified polypropylene type resin particle obtained by impregnating the above particle with a foaming agent, a styrene-modified polypropylene type resin foamed particle obtained by prefoaming the above particle, a styrene-modified polypropylene type resin foamed molded product obtained by internal foam molding of the foamed particle, and production methods for the above particles and products.

Priority is claimed on Japanese Patent Application No. 2006-52110, filed Feb. 28, 2006, the content of which is incorporated herein by reference.

BACKGROUND ART

Conventionally, polystyrene type resin foamed molded products obtained by filling a mold with polystyrene type resin prefoamed particles and then heating to effect foaming are known to exhibit excellent rigidity, thermal insulation properties, lightweight properties, water resistance and foam moldability. As a result, these foamed molded products are used widely as cushioning materials and thermal insulation materials for construction materials. However, these foamed molded products suffer from poor levels of chemical resistance and impact resistance.

On the other hand, foamed molded products formed from a polypropylene type resin are known to exhibit excellent chemical resistance and impact resistance. As a result, these foamed molded products are used in automotive components.

However, because polypropylene type resins exhibit poor retention of the foaming gas, the foam molding conditions must be controlled very precisely, which leads to a problem of increased production costs. In addition, polypropylene type resin foamed molded products exhibit inferior rigidity to polystyrene type resin foamed molded products.

In order to address these problems associated with polystyrene type resins and polypropylene type resins, foamed molded products obtained by complexing a polystyrene type resin having favorable rigidity and foam molding properties with a polypropylene type resin having favorable chemical resistance and impact resistance have been proposed (for example, see Patent Documents 1 and 2).

Patent Document 1 has an object of providing a foamed molded product with practically applicable levels of impact resistance, rigidity and surface properties and the like, and discloses a method of obtaining prefoamed particles formed from a modified polypropylene type resin composition. This modified polypropylene type resin composition is obtained by heating an aqueous suspension containing 100 parts by weight of a polypropylene (a), 1 to 500 parts by weight of a vinyl type monomer component (b), and 0.01 to 10 parts by weight of a radical polymerization initiator per 100 parts by weight of the component (b), in some cases under conditions in which the vinyl type monomer component (b) undergoes no substantial homopolymerization; subsequently impregnating the polypropylene (a) with the vinyl type monomer component (b); and then further heating the aqueous suspension to at least a temperature at which the crystalline portion of the polypropylene (a) begins to melt substantially, thereby polymerizing the vinyl type monomer component (b).

Patent Document 2 discloses a method of obtaining spherical polypropylene type resin particles, the method including: dispersing pellets or a powder of a propylene type resin containing from 1 to 10% by weight of an ethylene component in an aqueous suspension, adding approximately 30 to 150 parts by weight of a styrene type monomer to the suspension and heating at a temperature of 130° C. or higher, and then conducting a polymerization in the presence of a polymerization catalyst.

However, in the modified resins obtained in the conventional methods disclosed in Patent Documents 1 and 2, dispersing the polystyrene type resin in a particulate form within the polypropylene type resin is difficult, particularly in the regions near the surface of the resin, meaning the resin often exhibits unsatisfactory chemical resistance.

Further, molded products produced by foam molding using modified resin particles produced using these conventional methods are unable to satisfactorily combine heat resistance with penetration impact resistance.

[Patent Document 1]
Japanese Unexamined Patent Application, First Publication No. Hei 9-194623
[Patent Document 2]
Japanese Unexamined Patent Application, First Publication No. Sho 61-9432

DISCLOSURE OF INVENTION

The present invention takes the above circumstances into consideration, with an object of providing a styrene-modified polypropylene type resin foamed molded product that remedies the drawbacks associated with polystyrene type resin foamed molded products and polypropylene type resin foamed molded products, and exhibits excellent mechanical properties and chemical resistance.

As a result of intensive research aimed at achieving the above object, the inventors of the present invention discovered that by using a polypropylene type resin particle having a specific melting point as the polypropylene type resin particles, adding a styrene type monomer to these particles, and then conducting polymerization within a specific temperature range, styrene-modified polypropylene type resin particles could be obtained in which the quantity of the polypropylene type resin near the surface of the particles was increased, the quantity of styrene increased with increasing proximity to the central portion of the particles, and the polypropylene type resin and polystyrene type resin existed in a distinct islands-in-sea structure.

Moreover, the inventors also discovered that when foamable resin particles obtained by impregnating the styrene-modified polypropylene type resin particles having an islands-in-sea structure produced in this manner with a foaming agent were subjected to prefoaming, and the foamed particles were then placed in a molding die and subjected to internal foam molding within the die, a styrene-modified polypropylene type resin foamed molded product could be produced that combined the advantages of a polypropylene type resin and a polystyrene type resin, and exhibited excellent levels of rigidity, foam moldability, chemical resistance, and impact resistance, and they were therefore able to complete the present invention.

The present invention provides a styrene-modified polypropylene type resin particle that includes a polypropylene type resin and a polystyrene type resin, wherein the polystyrene type resin is included at 30 parts by weight or more but less than 600 parts by weight per 100 parts by weight of the polypropylene type resin, and polystyrene type resin particles having a longitudinal diameter of 5 μm or less are dispersed in the polypropylene type resin.

Further, the present invention also provides a foamable styrene-modified polypropylene type resin particle prepared by impregnating the above styrene-modified polypropylene type resin particle with a foaming agent.

Furthermore, the present invention also provides a styrene-modified polypropylene type resin foamed particle obtained by prefoaming the above foamable styrene-modified polypropylene type resin particle.

Moreover, the present invention also provides a styrene-modified polypropylene type resin foamed molded product prepared by packing the above styrene-modified polypropylene type resin foamed particle into a molding die and conducting foam molding, wherein the foamed molded product has a density within a range from 0.01 to 0.2 g/cm³.

In the styrene-modified polypropylene type resin foamed molded product of the present invention, the shrinkage factor for the foamed molded product in a dimensional change measurement conducted in accordance with JIS K 6767 under conditions at 90° C. is preferably 1.0% or less.

Furthermore, the present invention also provides a method of producing a styrene-modified polypropylene type resin particle, including:

dispersing 100 parts by weight of a polypropylene type resin particle having a melting point of 120 to 145° C., 30 parts by weight or more but less than 600 parts by weight of a styrene type monomer, and a polymerization initiator within an aqueous suspension containing a dispersant, heating the resulting dispersion to a temperature at which the styrene type monomer undergoes no substantial polymerization, thereby incorporating the styrene type monomer within the polypropylene type resin particle, and performing polymerization of the styrene type monomer at a temperature within a range from (T−10) to (T+20)° C., wherein T° C. represents the melting point of the polypropylene type resin particle.

In this aspect of the present invention, the melting point of the polypropylene type resin particle is preferably within a range from 140 to 145° C. Further, in those cases where the melting point of the polypropylene type resin particle is within a range from 120 to 140° C. (and particularly 120° C. or more but less than 140° C.), the polymerization of the styrene type monomer in the polymerization step is preferably performed at a temperature within a range from (T) to (T+20)° C.

Furthermore, the present invention also provides a method of producing a styrene-modified polypropylene type resin particle, including:

dispersing 100 parts by weight of a polypropylene type resin particle having a melting point of 120 to 140° C., 20 parts by weight or more but less than 100 parts by weight of a styrene type monomer, and a polymerization initiator within an aqueous suspension containing a dispersant, heating the resulting dispersion to a temperature at which the styrene type monomer undergoes no substantial polymerization, thereby incorporating the styrene type monomer within the polypropylene type resin particle, performing a first polymerization of the styrene type monomer at a temperature within a range from (T−10) to (T+20)° C., wherein T° C. represents the melting point of the polypropylene type resin particle, and following the first polymerization, adding a styrene type monomer and a polymerization initiator, and setting the temperature to a value within a range from (T−25) to (T+15)° C., thereby incorporating the styrene type monomer within the polypropylene type resin particle and performing a second polymerization (wherein, the total quantity of styrene type monomer used in the first and second polymerizations, per 100 parts by weight of the polypropylene type resin particle, is 30 parts by weight or more but less than 600 parts by weight).

In this aspect of the present invention, the melting point of the polypropylene type resin particle is preferably within a range from 140 to 145° C. Further, in those cases where the melting point of the polypropylene type resin particle is within a range from 120 to 140° C. (and particularly 120° C. or more but less than 140° C.), the polymerization of the styrene type monomer in the first polymerization is preferably performed at a temperature within a range from (T) to (T+20)° C., and the polymerization of the styrene type monomer in the second polymerization is preferably performed at a temperature within a range from (T−10) to (T+15)° C.

In the method of producing a styrene-modified polypropylene type resin particle according to the present invention, the polypropylene type resin particle is preferably a propylene-ethylene copolymer.

Furthermore, the present invention also provides a method of producing a foamable styrene-modified polypropylene type resin particle, wherein following the above method of producing a styrene-modified polypropylene type resin particle, the obtained styrene-modified polypropylene type resin particle is impregnated with a foaming agent to obtain a foamable styrene-modified polypropylene type resin particle.

Furthermore, the present invention also provides a method of producing a styrene-modified polypropylene type resin foamed particle, wherein following the above method of producing a foamable styrene-modified polypropylene type resin particle, the obtained foamable styrene-modified polypropylene type resin particle is heated and prefoamed to obtain a foamed particle.

Moreover, the present invention also provides a method of producing a styrene-modified polypropylene type resin foamed molded product, wherein following the above method of producing a styrene-modified polypropylene type resin foamed particle, the obtained styrene-modified polypropylene type resin foamed particle is packed inside the cavity of a molding die, subsequently subjected to internal foam molding within the die, and the molded product is then released from the molding die.

The styrene-modified polypropylene type resin particle of the present invention has an islands-in-sea structure in which polystyrene type resin particles having a longitudinal diameter of 5 μm or less are dispersed within the polypropylene type resin, and therefore a foamed molded product obtained by impregnating the particle with a foaming agent, prefoaming the resulting foamable resin particle, and then packing this foamed particle within a molding die and conducting internal foam molding combines the advantages of a polystyrene type resin foamed molded product and a polypropylene type resin, and is a foamed molded product that exhibits excellent levels of rigidity, foam moldability, chemical resistance, and impact resistance. Hence, according to the present invention, a styrene-modified polypropylene type resin particle can be provided that is ideal for producing a foamed molded product having these types of excellent physical properties.

The foamable styrene-modified polypropylene type resin particle of the present invention is prepared by impregnating the above styrene-modified polypropylene type resin particle with a foaming agent, and therefore a foamable styrene-modified polypropylene type resin particle can be provided that is ideal for producing a foamed molded product that exhibits excellent levels of rigidity, foam moldability, chemical resistance, and impact resistance.

The styrene-modified polypropylene type resin foamed particle of the present invention is produced by prefoaming the above foamable particle, and therefore a styrene-modified polypropylene type resin foamed particle can be provided that is ideal for producing a foamed molded product that exhibits excellent levels of rigidity, foam moldability, chemical resistance, and impact resistance.

The styrene-modified polypropylene type resin foamed molded product of the present invention is prepared by internal foam molding of the above styrene-modified polypropylene type resin foamed particle, and can therefore provide a foamed molded product that exhibits excellent levels of rigidity, foam moldability, chemical resistance, and impact resistance.

The method of producing a styrene-modified polypropylene type resin particle of the present invention is a method in which, by dispersing a polypropylene type resin particle having a melting point of 120 to 145° C., a styrene type monomer and a polymerization initiator within an aqueous suspension containing a dispersant, subsequently incorporating the styrene type monomer within the polypropylene type resin particle, and then either performing a single stage polymerization at a temperature within a range from (T−10) to (T+20)° C., or performing a first polymerization at a temperature within a range from (T) to (T+20)° C. and then performing a second polymerization of the styrene type monomer at a temperature within a range from (T−25) to (T+15)° C., wherein T° C. represents the melting point of the polypropylene type resin particle, a styrene-modified polypropylene type resin particle can be produced that has an islands-in-sea structure in which polystyrene type resin particles having a longitudinal diameter of 5 µm or less are dispersed within the polypropylene type resin.

In those cases where a foamable resin particle, produced by impregnating the obtained styrene-modified polypropylene type resin particle with a foaming agent, is prefoamed, and the foamed particle is then packed in a molding die and subjected to internal foam molding, a foamed molded product can be obtained that combines the advantages of a polystyrene type resin foamed molded product and a polypropylene type resin, and exhibits excellent levels of rigidity, foam moldability, chemical resistance, and impact resistance. According to this production method, a styrene-modified polypropylene type resin particle can be produced that is ideal for producing a foamed molded product having these types of excellent physical properties.

The method of producing a foamable styrene-modified polypropylene type resin particle according to the present invention is a method in which the foamable styrene-modified polypropylene type resin particle is produced by impregnating the styrene-modified polypropylene type resin particle described above with a foaming agent, and the method can therefore provide a foamable styrene-modified polypropylene type resin particle that is ideal for producing a foamed molded product that exhibits excellent levels of rigidity, foam moldability, chemical resistance, and impact resistance.

The method of producing a styrene-modified polypropylene type resin foamed particle according to the present invention is a method in which the styrene-modified polypropylene type resin foamed particle is produced by prefoaming the foamable styrene-modified polypropylene type resin particle described above, and the method can therefore provide a styrene-modified polypropylene type resin foamed particle that is ideal for producing a foamed molded product that exhibits excellent levels of rigidity, foam moldability, chemical resistance, and impact resistance.

The method of producing a styrene-modified polypropylene type resin particle foamed molded product according to the present invention is a method in which the styrene-modified polypropylene type resin particle foamed molded product is produced by subjecting the styrene-modified polypropylene type resin foamed particle described above to internal foam molding, and the method can therefore provide a styrene-modified polypropylene type resin particle foamed molded that exhibits excellent levels of rigidity, foam moldability, chemical resistance, and impact resistance.

BEST MODE FOR CARRYING OUT THE INVENTION

A styrene-modified polypropylene type resin particle of the present invention includes 30 parts by weight or more but less than 600 parts by weight of a polystyrene type resin per 100 parts by weight of a polypropylene type resin, and polystyrene type resin particles having a longitudinal diameter of 5 µm or less, and preferably 3 µm or less, and most preferably from 0.05 to 2.5 µm, are dispersed in the polypropylene type resin.

There are no particular restrictions on the polypropylene type resin that functions as one of the resin materials within the styrene-modified polypropylene type resin particle of the present invention, provided the resin has a melting point within a range from 120 to 145° C., and resins produced using conventional methods can be used. If the melting point of the polypropylene type resin is lower than 120° C., then the heat resistance tends to be poor, and the heat resistance of the styrene-modified polypropylene type resin foamed molded product produced using the styrene-modified polypropylene type resin particle tends to deteriorate. Further, if the melting point is higher than 145° C., then the polymerization temperature increases, and a favorable polymerization can not be conducted.

In a preferred embodiment of the present invention, a propylene-ethylene copolymer having a melting point within a range from 120 to 145° C. is used as the polypropylene type resin. This propylene-ethylene copolymer contains a copolymer of propylene and ethylene as the main component, but may also include other monomers capable of copolymerizing with the ethylene or propylene within the resin molecules. Examples of these other monomers include either one, or two or more monomers selected from amongst α-olefins, cyclic olefins, and diene type monomers. This propylene-ethylene copolymer has a melting point within a range from 120 to 145° C., and may be a random, block, or three dimensional network copolymer. Furthermore, in those cases where multiple melting points exist, the temperature of the lowest melting point is deemed the melting point (T° C.).

If required, the polypropylene type resin particle may also include additives such as colorants, flame retardants, antioxidants and ultraviolet absorbers and the like. Of these, as the colorant, both inorganic and organic colorants may be used. Inorganic colorants such as iron oxide and carbon black and the like are particularly preferred.

Examples of the polystyrene type resin that functions as the other resin material within the styrene-modified polypropylene type resin particle of the present invention include resins obtained by polymerizing a styrene type monomer such as styrene, α-methylstyrene, p-methylstyrene, and t-butylstyrene. Moreover, the polystyrene type resin may be a copolymer of a styrene type monomer and another monomer capable of copolymerization with the styrene type monomer. Examples of this other monomer include polyfunctional monomers such as divinylbenzene, and alkyl (meth)acrylates that contain no benzene ring within their structure, such as butyl (meth)acrylate. These other monomers may be used in a quantity that does not substantially exceed 5% by weight relative to the polystyrene type resin. In this description, both styrenes and the monomers that are capable of copolymerization with styrenes are referred to as styrene type monomers.

In the present invention, the term "(meth)acrylic acid" refers to either one of, or both, acrylic acid in which a hydrogen atom is bonded at the α-position, and methacrylic acid in which a methyl group is bonded at the α-position.

The quantity of the polystyrene type resin is set within a range from 30 to 600 parts by weight per 100 parts by weight of the polypropylene type resin. A preferred blend quantity for the polystyrene type resin is from 100 to 550 parts by weight, and a quantity from 130 to 500 parts by weight is even more desirable. If this proportion of the polystyrene type resin exceeds 600 parts by weight, the chemical resistance and impact resistance of the foamed molded product obtained by internal foam molding of the foamed particle tend to deteriorate, which is undesirable. In contrast, if the proportion of the polystyrene type resin is less than 30 parts by weight, then the rigidity of the foamed molded product obtained by internal foam molding of the foamed particle tends to deteriorate, which is also undesirable.

In the styrene-modified polypropylene type resin particle of the present invention, the polystyrene type resin exists in a state in which polystyrene type resin particles having a longitudinal diameter of 5 µm or less, and preferably 3 µm or less, are dispersed within the polypropylene type resin. The lower limit for the longitudinal particle diameter is preferably 0.05 µm or more.

Figure 1:
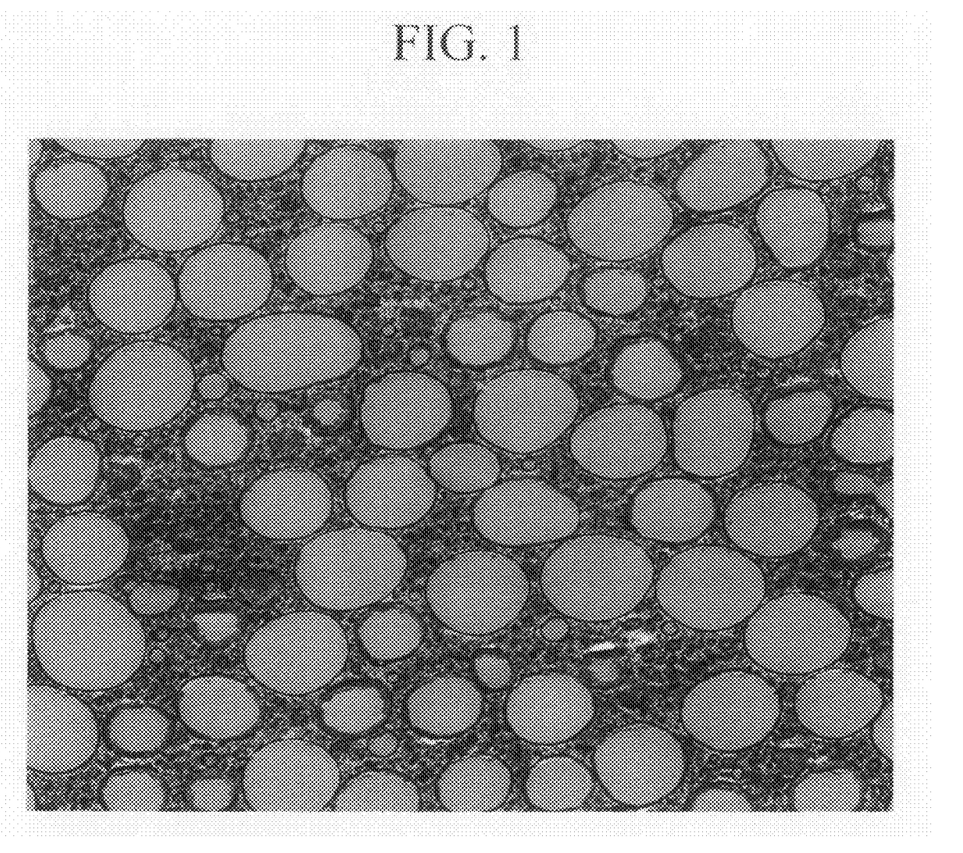
FIG. 1 is a diagram showing a cross-sectional TEM image of a styrene-modified polypropylene type resin particle produced in Example 6 according to the present invention.

FIG. 1 is a diagram showing a cross-sectional TEM image of a styrene-modified polypropylene type resin particle of the present invention. As is evident from FIG. 1, the styrene-modified polypropylene type resin particle of the present invention exists in a state in which fine particles of the polystyrene type resin are dispersed uniformly within the polypropylene type resin in an islands-in-sea structure. On the other hand, in a styrene-modified polypropylene type resin particle of a comparative example shown in FIG. 2, the type of islands-in-sea structure shown in FIG. 1, including fine particles of the polystyrene type resin within the polypropylene type resin, could not be confirmed.

Because the styrene-modified polypropylene type resin particle of the present invention has an islands-in-sea structure in which polystyrene type resin particles having a longitudinal diameter of 5 µm or less are dispersed within the polypropylene type resin, a foamed molded product obtained by impregnating the particle with a foaming agent, prefoaming the resulting foamable resin particle, and then packing this foamed particle within a molding die and conducting internal foam molding combines the advantages of a polystyrene type resin foamed molded product and a polypropylene type resin, and is a foamed molded product that exhibits excellent levels of rigidity, foam moldability, chemical resistance, and impact resistance. Hence, according to the present invention, a styrene-modified polypropylene type resin particle can be provided that is ideal for producing a foamed molded product having these types of excellent physical properties.

The aforementioned styrene-modified polypropylene type resin particle according to the present invention can be produced efficiently, or with a favorable yield, by employing a method of producing a styrene-modified polypropylene type resin particle according to the present invention that includes either each of Steps (A) to (C) described below, or each of Steps (A) to (D) described below:

(A) dispersing 100 parts by weight of a polypropylene type resin particle having a melting point of 120 to 145° C., 30 parts by weight or more but less than 600 parts by weight of a styrene type monomer (20 parts by weight or more but less than 100 parts by weight of a styrene type monomer in those cases where Step (D) is performed), and a polymerization initiator within an aqueous suspension containing a dispersant; (B) heating the resulting dispersion to a temperature at which the styrene type monomer undergoes no substantial polymerization, thereby incorporating the styrene type monomer within the polypropylene type resin particle; (C) performing a first polymerization of the styrene type monomer at a temperature within a range from (T−10) to (T+20)° C., wherein T° C. represents the melting point of the polypropylene type resin particle; and (D) following the first polymerization, adding a styrene type monomer and a polymerization initiator, and setting the temperature to a value within a range from (T−25) to (T+15)° C., wherein T° C. represents the melting point of the polypropylene type resin particle, thereby incorporating the styrene type monomer within the polypropylene type resin particle and performing a second polymerization (wherein, the total quantity of styrene type monomer used in the first and second polymerizations, per 100 parts by weight of the polypropylene type resin particle, is 30 parts by weight or more but less than 600 parts by weight).

Each of Steps (A) to (D) can be conducted using an autoclave polymerization apparatus or the like that is used for executing conventional polystyrene type resin suspension polymerization methods or seed polymerization methods, in which beads of polystyrene type resin particles are produced using a styrene type monomer as the raw material, although the production apparatus used is not restricted to this type of apparatus.

In Step (A), the polypropylene type resin particle can be obtained, for example, by melting the resin in an extruder and then conducting pelletization using a strand cut, under-water cut, or hot cut technique, or by crushing the resin particles within a crusher and conducting pelletization directly. The shape of the resin particles may be spherical, elliptical (egg-shaped), circular cylindrical, or prismatic cylindrical or the like. A preferred resin particle diameter for the polypropylene type resin particle is within a range from 0.5 to 1.5 mm, and a particle diameter within a range from 0.6 to 1.0 mm is even more desirable.

Further, as described above, either a styrene monomer, or a mixture of a styrene monomer composed mainly of styrene and another monomer capable of copolymerization with the styrene may be used as the styrene type monomer. If the blend quantity of the styrene type monomer exceeds 600 parts by weight, then particles composed solely of the polystyrene type resin that have not been incorporated within the polypropylene type resin particle tend to occur, which is undesirable. In addition, the chemical resistance and impact resistance of the foamed molded product obtained by secondary foaming of the prefoamed particles tend to deteriorate, which is undesirable. In contrast, if the blend quantity of the styrene type monomer is less than 30 parts by weight, then although the time required for incorporating the styrene type monomer within the polypropylene type resin particle and then performing polymerization is shortened, the ability of the resulting styrene-modified polypropylene type resin particle to retain a foaming agent deteriorates, meaning the particle is unable to undergo high foaming, which is undesirable. In addition, the rigidity of the foamed molded product obtained by secondary foaming of the prefoamed particles tends to deteriorate, which is undesirable.

Examples of the dispersant used in Step (A) include organic dispersants such as partially saponified polyvinyl alcohol, polyacrylates, polyvinylpyrrolidone, carboxymethylcellulose, and methylcellulose; and inorganic dispersants such as magnesium pyrophosphate, calcium pyrophosphate, calcium phosphate, calcium carbonate, magnesium phosphate, magnesium carbonate, and magnesium oxide. Of these, inorganic dispersants are preferred. If an inorganic dispersant is used, a surfactant may also be used in combination with the dispersant. Examples of this surfactant include sodium dodecylbenzenesulfonate and sodium α-olefinsulfonates.

Furthermore, as the polymerization initiator, conventional polymerization initiators typically used in styrene type monomer polymerizations can be used. Examples include organic peroxides such as benzoyl peroxide, lauroyl peroxide, t-amyl peroxyoctoate, t-butyl peroxybenzoate, t-amyl peroxybenzoate, t-butyl peroxypivalate, t-butyl peroxyisopropylcarbonate, t-butyl peroxyacetate, t-butyl peroxy-3,3,5-trimethylcyclohexanoate, di-t-butyl peroxyhexahydroterephthalate, 2,2-di-t-butyl peroxybutane, and dicumyl peroxide; and azo compounds such as azobisisobutyronitrile and azobisdimethylvaleronitrile. The polymerization initiator may be used either alone or in combination.

Further, if a cross-linking agent is added, then examples of the addition method include methods in which the cross-linking agent is added directly to the polypropylene type resin, methods in which the cross-linking agent is dissolved in a solvent, plasticizer or styrene type monomer prior to addition, and methods in which the cross-linking agent is dispersed in water prior to addition. Of these, methods in which the cross-linking agent is dissolved in the styrene type monomer prior to addition are preferred.

In order to effectively impregnate the polypropylene type resin particle, the styrene type monomer may be added continuously or intermittently to an aqueous medium. The styrene type monomer is preferably added gradually to the aqueous medium. Examples of the aqueous medium include water, and mixed media containing water and a water-soluble solvent (such as an alcohol).

In Step (B), the temperature during heating of the dispersion obtained in Step (A) to a temperature at which the styrene type monomer undergoes no substantial polymerization, thereby impregnating the styrene type monomer within the polypropylene type resin particle, is typically within a range from 45 to 70° C., and is preferably from 50 to 65° C. If this impregnation temperature is less than the above range, then the impregnation of the styrene type monomer tends to be unsatisfactory, and a polymerization powder of polystyrene is generated, which is undesirable. In contrast, if the impregnation temperature exceeds the above range, then polymerization tends to occur prior to satisfactory impregnation of the styrene type monomer into the polypropylene type resin particle, which is also undesirable.

In Step (C) and Step (D), the polymerization temperature is an important factor, and if the melting point of the polypropylene type resin particle is deemed T° C., then in Step (C) (the first polymerization), the polymerization temperature is set within a range from (T−10) to (T+20)° C., and in Step (D) (the second polymerization), the polymerization temperature is set within a range from (T−25) to (T+15)° C. By performing the polymerization(s) within the above temperature range(s), the inside of the resin particle adopts a structure in which spherical "islands" of the polystyrene type resin exist within a "sea" of the polypropylene type resin. By achieving this type of structure, the advantages of a polystyrene type resin foamed molded product and a polypropylene type resin can both be realized, meaning a styrene-modified polypropylene type resin particle can be provided that is ideal for producing a foamed molded product having excellent levels of rigidity, foam moldability, chemical resistance, and impact resistance. If the temperature is lower than the above polymerization temperature, then a distinct islands-in-sea structure between the polypropylene type resin and the polystyrene type resin is not formed within the resin particles, and therefore a resin particle or foamed molded product that exhibits excellent physical properties is unobtainable. Further, if the temperature is higher than the above polymerization temperature, then the polymerization temperature increases, and because the polymerization is initiated before the styrene type monomer has been adequately incorporated within the polypropylene type resin particle, a resin particle or foamed molded product that exhibits excellent physical properties is unobtainable. Furthermore, expensive polymerization equipment with a high degree of heat resistance is required.

Following the polymerization of Step (C), or Step (C) and Step (D), the reaction tank is cooled, and the formed styrene-modified polypropylene type resin particle is separated from the aqueous medium, yielding a styrene-modified polypropylene type resin particle that contains 30 parts by weight or more but less than 600 parts by weight of the polystyrene type resin per 100 parts by weight of the polypropylene type resin, in which polystyrene type resin particles having a longitudinal diameter of 5 μm or less, and preferably 3 μm or less, are dispersed within the polypropylene type resin.

According to the method of producing a styrene-modified polypropylene type resin particle of the present invention, by dispersing a polypropylene type resin particle having a melting point of 120 to 145° C., a styrene type monomer, and a polymerization initiator within an aqueous suspension containing a dispersant, subsequently incorporating the styrene type monomer within the polypropylene type resin particle, and then either performing a single stage polymerization at a temperature within a range from (T−10) to (T+20)° C., or performing a first polymerization at a temperature within a range from (T) to (T+20)° C. and then performing a second polymerization of the styrene type monomer at a temperature within a range from (T−25) to (T+15)° C., wherein T° C. represents the melting point of the polypropylene type resin particle, a styrene-modified polypropylene type resin particle can be produced that has an islands-in-sea structure in which polystyrene type resin particles having a longitudinal diameter of 5 μm or less are dispersed within the polypropylene type resin. In those cases where a foamable resin particle, produced by impregnating the obtained styrene-modified polypropylene type resin particle with a foaming agent, is prefoamed, and the foamed particle is then packed in a molding die and subjected to internal foam molding, a foamed molded product can be obtained that combines the advantages of a polystyrene type resin foamed molded product and a polypropylene type resin, and exhibits excellent levels of rigidity, foam moldability, chemical resistance, and impact resistance. Hence, according to this production method, a styrene-modified polypropylene type resin particle can be produced that is ideal for producing a foamed molded product having these types of excellent physical properties.

The present invention provides a foamable styrene-modified polypropylene type resin particle, obtained by impregnating the above styrene-modified polypropylene type resin particle with a foaming agent, and preferably a high-volatility foaming agent, and also provides a method of producing such a foamable styrene-modified polypropylene type resin particle.

Examples of the high-volatility foaming agent impregnated within the styrene-modified polypropylene type resin particle include readily volatile compounds having a boiling point that is no higher than the softening temperature of the polymer, and examples include propane, n-butane, i-butane, n-pentane, i-pentane, cyclopentane, carbon dioxide gas and nitrogen, and these foaming agents may be used either alone, or in combinations of two or more different foaming agents. The quantity used of the high-volatility foaming agent is preferably within a range from 5 to 25 parts by weight per 100 parts by weight of the styrene-modified polypropylene type resin particle.

Moreover, a foaming assistant may also be used in combination with the foaming agent. Examples of this type of foaming assistant include solvents such as toluene, xylene, ethylbenzene, cyclohexane and D-limonene; and plasticizers (high boiling point solvents) such as diisobutyl adipate, diacetylated monolaurate and coconut oil. The quantity added of the foaming assistant is preferably within a range from 0.1 to 2.5 parts by weight per 100 parts by weight of the styrene-modified polypropylene type resin particle.

Furthermore, surface treatment agents such as binding inhibitors, fusion promoters, antistatic agents and spreading agents may also be added to the foamable styrene-modified polypropylene type resin particle.

A binding inhibitor performs the role of preventing adhesion between prefoamed particles during prefoaming of the modified resin particles. Here, the term "adhesion" refers to the process in which a plurality of prefoamed particles bind together to form a single integrated particle. Specific examples of the binding inhibitor include talc, calcium carbonate, zinc stearate, aluminum hydroxide, ethylene bis-stearyl amide, calcium triphosphate, and dimethylpolysiloxane.

A fusion promoter performs the role of promoting fusion of prefoamed particles during secondary foam molding of the prefoamed particles. Specific examples include stearic acid, stearic triglyceride, hydroxystearic triglyceride, and sorbitan stearate.

Examples of antistatic agents include polyoxyethylene alkylphenol ethers and stearyl monoglyceride. Examples of spreading agents include polybutene, polyethylene glycol and silicone oil. The combined quantity of the above surface treatment agents is preferably within a range from 0.01 to 2.0 parts by weight per 100 parts by weight of the foamable styrene-modified polypropylene type resin particle.

The method used for impregnating the styrene-modified polypropylene type resin particle with the foaming agent may be selected in accordance with the variety of foaming agent used. Examples include methods in which the foaming agent is injected into an aqueous medium containing the styrene-modified polypropylene type resin particle dispersed therein, thereby incorporating the foaming agent within the resin particle, and methods in which the styrene-modified polypropylene type resin particle is supplied to a rotational mixer, and the foaming agent is also injected into the rotational mixer, thereby incorporating the foaming agent within the resin particle. The temperature during impregnation of the foaming agent into the styrene-modified polypropylene type resin particle is typically within a range from 50 to 140° C.

A foamable styrene-modified polypropylene type resin particle of the present invention is prepared by impregnating the above styrene-modified polypropylene type resin particle with a foaming agent, and can therefore provide a foamable styrene-modified polypropylene type resin particle that is ideal for producing a foamed molded product that exhibits excellent levels of rigidity, foam moldability, chemical resistance, and impact resistance.

The present invention also provides a styrene-modified polypropylene type resin foamed particle (hereafter referred to as the prefoamed particle) obtained by heating and prefoaming the above foamable styrene-modified polypropylene type resin particle, as well as a method of producing the prefoamed particle. The heating conditions used for this prefoaming, and the apparatus used for the prefoaming may use the same conditions and apparatus as those used in the production of conventional polystyrene type resin prefoamed particles. For example, the prefoamed particle can be obtained by heating the foamable styrene-modified polypropylene type resin particle inside a prefoaming apparatus under an atmosphere including a steam pressure of 0.5 to 4.0 $kg/cm^2G$ (approximately 0.05 to 0.4 MPa). The heating time is typically within a range from approximately 20 to 90 seconds.

The prefoamed particle has a bulk density of 0.01 to 0.20 $g/cm^3$. A preferred bulk density is within a range from 0.014 to 0.15 $g/cm^3$. If the bulk density is less than 0.01 $g/cm^3$, then the independent foam ratio of the foamed particle tends to deteriorate, and the strength of the foamed molded product obtained by foaming the prefoamed particles also tends to deteriorate, both of which are undesirable. On the other hand, if the bulk density exceeds 0.20 $g/cm^3$, then the weight of the foamed molded product obtained by foaming the prefoamed particles increases, which is also undesirable.

There are no particular restrictions on the shape of the prefoamed particle, provided the shape has no adverse effects on the subsequent internal foam molding. Suitable shapes include spherical, elliptical (egg-shaped), circular cylindrical and prismatic cylindrical shapes. Of these, spherical and elliptical particles, which enable ready packing of the cavity inside the molding die, are particularly preferred.

This prefoamed particle may include additives. Examples of these additives include foaming nuclei such as talc, calcium silicate, ethylene bis-stearyl amide and methacrylate ester-based copolymers; fillers such as synthetic or naturally produced silicon dioxide and the like; flame retardants such as hexabromocyclododecane and triallyl isocyanurate hexabromide; plasticizers such as diisobutyl adipate, liquid paraffin, glycerol diacetomonolaurate and coconut oil; colorants such as carbon black and graphite; as well as ultraviolet absorbers and antioxidants.

The prefoamed particle of the present invention is produced by prefoaming the aforementioned foamable styrene-modified polypropylene type resin particle, and can therefore provide a prefoamed particle that is ideal for producing a foamed molded product that exhibits excellent levels of rigidity, foam moldability, chemical resistance, and impact resistance.

The present invention also provides a styrene-modified polypropylene type resin foamed molded product (hereafter referred to as the foamed molded product) obtained by internal foam molding of the prefoamed particle described above, as well as a method of producing such a foamed molded product.

In order to convert the above prefoamed particle to a foamed molded product, the prefoamed particle is usually aged by standing for approximately 24 hours, and is subsequently packed inside the cavity of a molding die, and then heated to effect internal foam molding, thereby causing the prefoamed particles to fuse together to form a foamed molded product having the desired shape. This internal foam molding can be conducted, for example, by introducing steam with a vapor pressure of 0.5 to 4.5 kg/cm$^2$G (approximately 0.05 to 0.45 MPa) into the interior of the molding die.

A foamed molded product of the present invention has a density within a range from 0.01 to 0.2 g/cm$^3$, and preferably within a range from 0.02 to 0.1 g/cm$^3$. If the density of the foamed molded product is less than 0.01 g/cm$^3$, then shrinkage of the foamed molded product tends to occur, and a favorable foamed molded product can not be obtained. Further, if the density exceeds 0.2 g/cm$^3$, then because the foam expansion ratio falls, a favorable foamed molded product can not be obtained.

Furthermore, according to the foamed molded product of the present invention, the shrinkage factor for the foamed molded product in a dimensional change measurement conducted in accordance with JIS K 6767 under conditions at 90° C. is preferably 1.0% or less. If this shrinkage factor exceeds 1.0%, then the molded product suffers from poor dimensional stability, which is undesirable.

Smaller shrinkage factors are more desirable, and therefore there is no need to specify a lower limit for the shrinkage factor. Accordingly, the lower limit for the shrinkage factor is preferably zero.

The foamed molded product of the present invention is obtained by internal foam molding of the styrene-modified polypropylene type resin foamed particle described above, and can therefore provide a foamed molded product that exhibits excellent levels of rigidity, foam moldability, chemical resistance, and impact resistance.

The foamed molded product obtained in the above manner can be used in all manner of applications, including as the core material for vehicle bumpers, vehicle cushioning materials such as the cushioning materials within door panels, electronic components, all manner of industrial materials, and transport containers for foodstuffs and the like. The foamed molded product can be used particularly favorably as a vehicle cushioning material.

EXAMPLES

The present invention is described in more detail below based on a series of examples, although the present invention is in no way limited by these examples. In the following examples, the methods used for measuring the melting point, bulk density, fusion rate, dimensional change upon heating, chemical resistance, penetration impact energy, and longitudinal particle diameter are described below.

<Melting Point>

The melting point was measured using the method described in JIS K 7122:1987 "Testing Methods for Heat of Transition of Plastics". Namely, using a differential scanning calorimeter apparatus RDC220 (manufactured by Seiko Instruments Inc.), 7 mg of the sample was packed in a measurement container, and under a nitrogen gas flow of 30 ml/min., the temperature was increased, decreased, and then increased again across a temperature range from room temperature to 220° C. at a rate of temperature change of 10° C./min., and the melting peak temperature on the DSC curve during the second temperature increase was recorded as the melting point. Further, in the case of two or more melting peaks, the peak temperature of the lower-temperature peak was recorded as the melting point.

<Bulk Density>

The bulk density of the prefoamed particle is measured under the following conditions. First, 500 cm$^3$ of the prefoamed particles are used to fill a measuring cylinder up to the 500 cm$^3$ graduation. Viewing the measuring cylinder from horizontally, the point where even a single prefoamed particle reaches the 500 cm$^3$ graduation is deemed to indicate the end point of the filling of the measuring cylinder with the prefoamed particles.

Subsequently, the weight of the prefoamed particles packed inside the measuring cylinder is measured to two decimal places, and that value is recorded as the weight W (g). The bulk density of the prefoamed particle is then calculated from the following formula.

Bulk density (g/cm$^3$)=$W$/500

<Density>

The density of the foamed molded product is measured under the following conditions. Measurement is conducted using the method described in JIS K 7222:1999 "Cellular plastics and rubbers—Determination of apparent density". A test piece of at least 50 cm$^3$ (or at least 100 cm$^3$ in the case of a semi-hard or soft material) is cut in such a manner so as not to alter the original cell strength of the material, the weight of the test piece is measured, and the density is then calculated from the following formula.

Density (g/cm$^3$)=test piece weight (g)/test piece volume (cm$^3$)

In terms of regulating the state of the test piece, the test piece for measurement is cut from a sample that has been left to stand for at least 72 hours from molding, and is subsequently left to stand for at least 16 hours in an atmosphere of (23° C.±2° C.)×(50%±5%) or (27° C.±2° C.)×(65%±5%).

<Fusion Rate>

In the surface of a rectangular parallelepiped-shaped foamed molded product having dimensions of length: 400 mm×width: 300 mm×height: 50 mm, a cutter was used to insert a cut of length 300 mm and depth 5 mm across the width direction, and the foamed molded product was then split in two along this cut. Within the split surface of the foamed molded product, the number of foamed particles (a) that had ruptured through the interior of the foamed particle, and the number of foamed particles (b) that had ruptured at the interface between foamed particles were measured, and the fusion rate was calculated from the following formula.

Fusion rate (%)=100×($a$)/[($a$)+($b$)]

<Dimensional Change Upon Heating>

The dimensional change upon heating was measured in accordance with the B method described in JIS K 6767: 1999K "Testing Methods for Foam Plastics and Polyethylene".

Using a test piece having dimensions of 150×150×original thickness (mm), three parallel straight lines having spacing of 50 mm were inserted along both the lengthwise and the widthwise directions within the central region of the test piece, the test piece was then placed in a circulating hot-air dryer at 90° C. for 22 hours, was subsequently removed and left to stand under normal conditions for one hour, and the dimensions of the lengthwise and widthwise lines were measured and inserted into the following formula.

$$S=(L_1-L_0)/L_0\times 100$$

(wherein, S represents the dimensional change upon heating (%), $L_1$ represents the average dimension (mm) following heating, and $L_0$ represents the initial average dimension (mm))

The dimensional change upon heating S was evaluated against the following criteria.

O: $0 \leq S < 1$; dimensional change is low, dimensional stability is favorable Δ: $1 \leq S < 5$; dimensional change is evident, but still practically applicable x: $S \geq 5$; dimensional change is marked, and product is not practically applicable <Chemical Resistance>

A sheet-shaped test piece having a planar rectangular shape of dimensions of length: 100 mm×width: 100 mm×thickness: 20 mm is cut from the foamed molded product, and then left to stand for 24 hours under conditions including a temperature of 23° C. and a humidity of 50%. The test piece is cut from the foamed molded product so that the entire upper surface of the test piece is formed from the surface of the foamed molded product.

Subsequently, 1 g of gasoline is applied uniformly to the test piece as a chemical, and is then left to stand for 60 minutes under conditions including a temperature of 23° C. and a humidity of 50%. Subsequently, the chemical is wiped off the upper surface of the test piece, and the upper surface of the test piece is inspected visually and evaluated against the following criteria.

O: Good; no change

Δ: Somewhat poor; softening of the surface x: Poor; surface collapse (shrinkage)

<Penetration Impact Energy>

The penetration impact energy was measured in accordance with the Dynatap impact test ASTM D-3763. As the test apparatus, a Dynatap impact tester GRC 8250 manufactured by General Research Corporation was used, and as test pieces, 5 pieces each having dimensions of length: 100 mm×width: 100 mm×height: 20 mm were cut from the foamed molded product so as to leave a surface skin. Under measurement conditions including a test temperature of −20° C., a test speed of 1.55 m/sec., a span with a circular aperture internal diameter of 76 mm, a drop height of 59 cm, a test load of 3.17 kg, and a vertical fall distance of 13 cm, measurements were conducted with n=5, and the average value was recorded as the penetration impact energy.

<Method of Measuring Longitudinal Particle Diameter>

The obtained styrene-modified polypropylene type resin particle or foamable styrene-modified polypropylene type resin particle was encapsulated within an epoxy resin, ultra thin slices were then prepared using an ultramicrotome Leica Ultracut UCT (manufactured by Leica Microsystems GmbH), and TEM photographs of these slices were taken using a transmission electron microscope H-7600 (manufactured by Hitachi, Ltd.). Ruthenium tetroxide was used as a staining agent. A cross-sectional cut was made that passed through the central region of a styrene-modified resin particle, the state of dispersion of the polystyrene type resin within this cross-section was inspected via a TEM photograph (12,800× magnification), and the longitudinal particle diameter of the dispersed styrene type resin particles was measured.

Example 1

100 parts by weight of a polypropylene type resin (product name: "PC540R", manufactured by SunAllomer Ltd., melting point: 132° C.) was supplied to an extruder, and molten kneading and under-water cutting were used to pelletize the resin and form elliptical (egg-shaped) polypropylene type resin particles. The average weight of these polypropylene type resin particles was approximately 0.6 mg.

Subsequently, 600 g of these polypropylene type resin particles were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.26 kg of a styrene monomer with 0.5 g of dicumyl peroxide dissolved therein was added dropwise to the aqueous suspension over a period of 30 minutes. Following completion of the dropwise addition, stirring was continued for 30 minutes, thereby absorbing the styrene monomer into the polypropylene type resin particles.

The temperature of the reaction system was then raised to 140° C., which is 8° C. higher than the melting point of the polypropylene type resin, and this temperature was held for 2 hours, thereby polymerizing the styrene monomer inside the polypropylene type resin particles (the first polymerization).

Subsequently, the reaction liquid from the first polymerization was adjusted to a temperature of 125° C., which is 7° C. lower than the melting point of the polypropylene type resin, 1.5 g of sodium dodecylbenzenesulfonate was added to the suspension, and then 1.14 kg of the styrene monomer containing 4 g of dicumyl peroxide dissolved therein as a polymerization initiator was added dropwise to the suspension over a period of 4 hours, thereby absorbing the styrene monomer into the polypropylene type resin particles while effecting a polymerization (the second polymerization).

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature, and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

The thus obtained foamable styrene-modified polypropylene type resin particles were prefoamed to a bulk density of 0.025 g/cm³, yielding prefoamed particles. The thus obtained prefoamed particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.025 g/cm³.

The obtained foamed molded product was measured for fusion rate, dimensional change upon heating, chemical resistance, and penetration impact energy.

Example 2

1,000 g of the polypropylene type resin particles described in Example 1 were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.43 kg of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the polypropylene type resin particles. Following this absorption, the temperature was raised to 140° C., and a polymerization was conducted at this temperature for a period of two hours.

Subsequently, the temperature was reduced to 125° C., 1.5 g of sodium dodecylbenzenesulfonate was added to the suspension, and then 0.57 kg of the styrene monomer containing 3 g of dicumyl peroxide dissolved therein as a polymerization initiator was added dropwise to the suspension over a period of 3 hours, thereby absorbing the styrene monomer into the polypropylene type resin particles and then effecting a polymerization.

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

The thus obtained foamable styrene-modified polypropylene type resin particles were prefoamed to a bulk density of 0.050 g/cm³, yielding prefoamed particles.

The thus obtained styrene-modified polypropylene prefoamed resin particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.050 g/cm³.

The obtained foamed molded product was measured for fusion rate, dimensional change upon heating, chemical resistance, and penetration impact energy.

Example 3

340 g of the polypropylene type resin particles described in Example 1 were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.15 kg of a styrene monomer with 0.3 g of dicumyl peroxide dissolved therein was added dropwise to the aqueous suspension over a period of 30 minutes. Following completion of the dropwise addition, stirring was continued for 30 minutes, thereby absorbing the styrene monomer into the polypropylene type resin particles. Following this absorption, the temperature was raised to 140° C., and a polymerization was conducted at this temperature for a period of two hours.

Subsequently, the temperature was reduced to 125° C., 1.5 g of sodium dodecylbenzenesulfonate was added to the suspension, and then 1.51 kg of the styrene monomer containing 5 g of dicumyl peroxide dissolved therein as a polymerization initiator was added dropwise to the suspension over a period of 5 hours, thereby absorbing the styrene monomer into the polypropylene type resin particles and then effecting a polymerization.

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

The thus obtained foamable styrene-modified polypropylene type resin particles were prefoamed to a bulk density of 0.020 g/cm³, yielding prefoamed particles.

The thus obtained prefoamed resin particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.020 g/cm³.

The obtained foamed molded product was measured for fusion rate, dimensional change upon heating, chemical resistance, and penetration impact energy.

Example 4

1,400 g of the polypropylene described in Example 1 was placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.20 kg of a styrene monomer with 0.4 g of dicumyl peroxide dissolved therein was added dropwise to the aqueous suspension over a period of 30 minutes. Following completion of the dropwise addition, stirring was continued for 30 minutes, thereby absorbing the styrene monomer into the polypropylene type resin particles. Following this absorption, the temperature was raised to 140° C., and a polymerization was conducted at this temperature for a period of two hours.

Subsequently, the temperature was reduced to 125° C., 1.5 g of sodium dodecylbenzenesulfonate was added to the suspension, and then 0.40 kg of the styrene monomer containing 2 g of dicumyl peroxide dissolved therein as a polymerization initiator was added dropwise to the suspension over a period of 2.5 hours, thereby absorbing the styrene monomer into the polypropylene type resin particles and then effecting a polymerization.

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

The thus obtained foamable styrene-modified polypropylene type resin particles were prefoamed to a bulk density of 0.080 g/cm$^3$, yielding prefoamed particles. The thus obtained prefoamed resin particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.080 g/cm$^3$.

The obtained foamed molded product was measured for fusion rate, dimensional change upon heating, chemical resistance, and penetration impact energy.

Example 5

With the exception of replacing the polypropylene type resin (product name: "PC540R") manufactured by SunAllomer Ltd. described in Example 1 with a resin "F-794NV" (manufactured by Prime Polymer Co., Ltd., melting point: 127° C.), foamable styrene-modified polypropylene type resin particles were obtained in the same manner as Example 1.

Prefoaming and internal foam molding were then conducted in the same manner as Example 1, yielding a foamed molded product having a density of 0.025 g/cm$^3$. This foamed molded product was measured for fusion rate, dimensional change upon heating, chemical resistance, and penetration impact energy.

Example 6

Instead of the polypropylene type resin (product name: "PC540R", manufactured by SunAllomer Ltd.) described in Example 1, 100 parts by weight of the resin "F-794NV" (manufactured by Prime Polymer Co., Ltd., melting point: 127° C.) was supplied to an extruder, and molten kneading and under-water cutting were used to pelletize the resin and form elliptical (egg-shaped) polypropylene type resin particles. The average weight of these polypropylene type resin particles was approximately 0.6 mg.

Subsequently, 600 g of these polypropylene type resin particles were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.26 kg of a styrene monomer with 0.5 g of dicumyl peroxide dissolved therein was added dropwise to the aqueous suspension over a period of 30 minutes. Following completion of the dropwise addition, stirring was continued for 30 minutes, thereby absorbing the styrene monomer into the polypropylene type resin particles.

The temperature of the reaction system was then raised to 140° C., which is 13° C. higher than the melting point of the polypropylene type resin, and this temperature was held for 2 hours, thereby polymerizing the styrene monomer inside the polypropylene type resin particles (the first polymerization).

Subsequently, the reaction liquid from the first polymerization was adjusted to a temperature of 135° C., which is 8° C. higher than the melting point of the polypropylene type resin, 1.5 g of sodium dodecylbenzenesulfonate was added to the suspension, and then 1.14 kg of the styrene monomer containing 6 g of dicumyl peroxide dissolved therein as a polymerization initiator was added dropwise to the suspension over a period of 4 hours, thereby absorbing the styrene monomer into the polypropylene type resin particles while effecting a polymerization (the second polymerization).

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

In order to observe the state of dispersion of the styrene resin within the obtained styrene-modified polypropylene type resin particles, a cross-section of a resin particle was observed using a TEM (12,800× magnification). The TEM image is shown in FIG. 1.

From FIG. 1 it is evident that a multitude of styrene type resin particles having a longitudinal particle diameter of approximately 0.05 to 0.2 μm are dispersed in the form of "islands" within a "sea" of the polypropylene type resin.

Subsequently, the resin particles were cooled to room temperature, and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles. The state of dispersion of the styrene resin within the obtained foamable styrene-modified polypropylene type resin particles, and the size of the longitudinal particle diameter were the same as those shown in FIG. 1.

Subsequently, the foamable styrene-modified polypropylene type resin particles were prefoamed to a bulk density of 0.025 g/cm$^3$, yielding prefoamed particles.

The thus obtained prefoamed particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.025 g/cm$^3$.

The obtained foamed molded product was measured for fusion rate, dimensional change upon heating, chemical resistance, and penetration impact energy.

Example 7

600 g of the polypropylene type resin particles described in Example 1 were placed in a 5 L autoclave fitted with a stirrer, 2 kg of pure water as an aqueous medium, 10 g of magnesium pyrophosphate, and 1.5 g of sodium dodecylbenzenesulfonate were added, the mixture was stirred to generate a suspension within the aqueous medium, stirring was continued for 10 minutes, and the temperature was then raised to 135° C., which is 3° C. higher than the melting point of the polypropylene type resin, yielding an aqueous suspension.

Subsequently, 1.4 kg of a styrene monomer with 4 g of dicumyl peroxide dissolved therein as a polymerization initiator was added dropwise to the aqueous suspension over a period of 4 hours, thereby absorbing the styrene monomer into the polypropylene type resin particles while effecting a polymerization.

Following completion of the dropwise addition, the temperature was held at 135° C. for one hour, and then increased to 140° C. and held for a further 2 hours and 30 minutes to complete the polymerization, thus yielding styrene-modified polypropylene type resin particles.

Subsequently, the resin particles were cooled to room temperature and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

The thus obtained foamable styrene-modified polypropylene type resin particles were prefoamed to a bulk density of 0.025 g/cm$^3$, yielding prefoamed particles.

The thus obtained prefoamed particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.025 g/cm$^3$.

The obtained foamed molded product was measured for fusion rate, dimensional change upon heating, chemical resistance, and penetration impact energy.

Example 8

100 parts by weight of a polypropylene type resin (product name: "F-744NP", manufactured by Prime Polymer Co., Ltd., melting point: 140° C.) was supplied to an extruder, and molten kneading and under-water cutting were used to pelletize the resin and form elliptical (egg-shaped) polypropylene type resin particles. The average weight of these polypropylene type resin particles was 0.6 mg.

Subsequently, 800 g of these polypropylene type resin particles were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.34 kg of a styrene monomer with 0.7 g of dicumyl peroxide dissolved therein was added dropwise to the aqueous suspension over a period of 30 minutes. Following completion of the dropwise addition, stirring was continued for 30 minutes, thereby absorbing the styrene monomer into the polypropylene type resin particles.

The temperature of the reaction system was then raised to 135° C., which is 5° C. lower than the melting point of the polypropylene type resin, and this temperature was held for 2 hours, thereby polymerizing the styrene monomer inside the polypropylene type resin particles (the first polymerization).

Subsequently, the reaction liquid from the first polymerization was adjusted to a temperature of 120° C., which is 20° C. lower than the melting point of the polypropylene type resin, 1.5 g of sodium dodecylbenzenesulfonate was added to the suspension, and then 0.86 kg of the styrene monomer containing 4 g of dicumyl peroxide dissolved therein as a polymerization initiator was added dropwise to the suspension over a period of 4 hours, thereby absorbing the styrene monomer into the polypropylene type resin particles while effecting a polymerization (the second polymerization).

Following completion of the dropwise addition, the temperature was held at 120° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature, and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

Subsequently, the foamable styrene-modified polypropylene type resin particles were prefoamed to a bulk density of 0.033 g/cm$^3$, yielding prefoamed particles.

The thus obtained prefoamed particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.033 g/cm$^3$.

The obtained foamed molded product was measured for fusion rate, dimensional change upon heating, chemical resistance, and penetration impact energy.

Comparative Example 1

250 g of the polypropylene type resin particles described in Example 1 were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.1 kg of a styrene monomer with 0.2 g of dicumyl peroxide dissolved therein was added dropwise to the aqueous suspension over a period of 30 minutes. After completion of the dropwise addition, stirring was continued for 30 minutes, thereby absorbing the styrene monomer into the polypropylene type resin particles. Following this absorption, the temperature was raised to 140° C., and a polymerization was conducted at this temperature for 2 hours.

Subsequently, the temperature was lowered to 125° C., 1.5 g of sodium dodecylbenzenesulfonate was added to the suspension, and then 1.65 kg of the styrene monomer containing 5 g of dicumyl peroxide dissolved therein as a polymerization initiator was added dropwise to the suspension over a period of 5 hours, thereby absorbing the styrene monomer into the polypropylene type resin particles and then effecting a polymerization.

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature, and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

Subsequently, the foamable styrene-modified polypropylene type resin particles were prefoamed to a bulk density of 0.020 g/cm$^3$, yielding prefoamed particles.

The thus obtained prefoamed particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. Under these molding conditions, a foamed molded product having favorable external appearance and fusion was obtained. The density of the obtained foamed molded product was 0.020 g/cm$^3$.

The obtained foamed molded product was measured for fusion rate, dimensional change upon heating, chemical resistance, and penetration impact energy.

Comparative Example 2

1,740 g of the polypropylene type resin particles described in Example 1 were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.06 kg of a styrene monomer with 0.1 g of dicumyl peroxide dissolved therein was added dropwise to the aqueous suspension over a period of 30 minutes. After completion of the dropwise addition, stirring was continued for 30 minutes, thereby absorbing the styrene monomer into the polypropylene type resin particles. Following this absorption, the temperature was raised to 140° C., and a polymerization was conducted at this temperature for 2 hours.

Subsequently, the temperature was lowered to 125° C., 1.5 g of sodium dodecylbenzenesulfonate was added to the suspension, and then 0.2 kg of the styrene monomer containing 1 g of dicumyl peroxide dissolved therein as a polymerization initiator was added dropwise to the suspension over a period of 1.5 hours, thereby absorbing the styrene monomer into the polypropylene type resin particles and then effecting a polymerization.

Following completion of the dropwise addition, the temperature was held at 125° C. for one hour, and the temperature was then increased to 140° C. and held for a further 2 hours and 30 minutes to complete the polymerization, thus yielding styrene-modified polypropylene type resin particles.

Subsequently, the resin particles were cooled to room temperature, and then removed from the 5 L autoclave. 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

Subsequently, an attempt was made to prefoam the foamable styrene-modified polypropylene type resin particles, but almost no foaming occurred, and prefoamed particles capable of undergoing foaming could not be obtained.

Comparative Example 3

800 g of the polypropylene type resin particles described in Example 8 were placed in a 5 L autoclave fitted with a stirrer, 2 kg of pure water as an aqueous medium, 10 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 0.34 kg of a styrene monomer with 0.7 g of dicumyl peroxide dissolved therein was added dropwise to the aqueous suspension over a period of 30 minutes. After completion of the dropwise addition, stirring was continued for 30 minutes, thereby absorbing the styrene monomer into the polypropylene type resin particles.

The temperature of the reaction system was then raised to 125° C., which is 15° C. lower than the melting point of the polypropylene type resin, and this temperature was held for 2 hours, thereby polymerizing the styrene monomer inside the polypropylene type resin particles (the first polymerization).

Subsequently, the reaction liquid from the first polymerization was adjusted to a temperature of 110° C., which is 30° C. lower than the melting point of the polypropylene type resin, 1.5 g of sodium dodecylbenzenesulfonate was added to the suspension, and then 0.86 kg of the styrene monomer containing 4 g of dicumyl peroxide dissolved therein as a polymerization initiator was added dropwise to the suspension over a period of 4 hours, thereby absorbing the styrene monomer into the polypropylene type resin particles while effecting a polymerization (the second polymerization).

Following completion of the dropwise addition, the temperature was held at 110° C. for one hour, and the temperature was then increased to 140° C. and held for a further 2 hours and 30 minutes to complete the polymerization, thus yielding styrene-modified polypropylene type resin particles. Subsequently, the resin particles were cooled to room temperature, and then removed from the 5 L autoclave.

A cross-section of the obtained resin particles was observed using a TEM (12,800× magnification). The TEM image is shown in FIG. 2.

Figure 2:
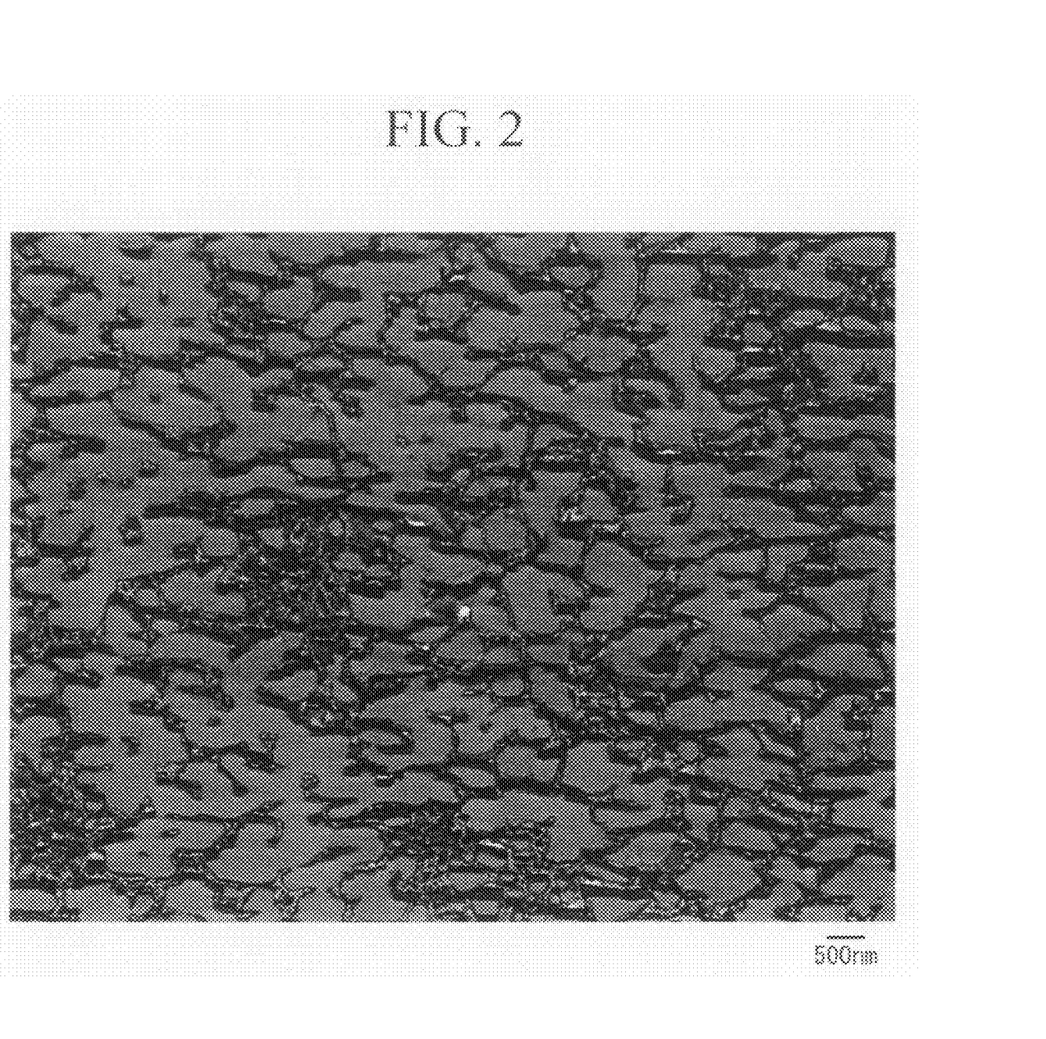
FIG. 2 is a diagram showing a cross-sectional TEM image of a resin particle prepared in Comparative Example 3.

From FIG. 2 it is evident that the islands-in-sea structure observed for the resin particles of Example 6 shown in FIG. 1 is absent.

Subsequently, 2 kg of the removed styrene-modified polypropylene type resin particles and 2 L of water were returned to the 5 L autoclave fitted with a stirrer, and 10 g of diisobutyl adipate as a plasticizer and 520 ml (300 g) of butane as a foaming agent were injected into the 5 L autoclave fitted with a stirrer. Following this injection, the temperature was raised to 70° C., and stirring was continued for 4 hours.

The system was then cooled to room temperature, and the suspension was removed from the 5 L autoclave, dewatered, and dried, yielding foamable styrene-modified polypropylene type resin particles.

Subsequently, the foamable styrene-modified polypropylene type resin particles were prefoamed to a bulk density of 0.10 g/cm$^3$, yielding prefoamed particles.

The thus obtained prefoamed particles were allowed to stand for one day at room temperature, and were then packed inside the cavity of a molding die having a cavity of dimensions 400 mm×300 mm×50 mm, heating was subsequently conducted by injecting steam at 0.20 MPa into the molding die for 50 seconds, and the system was then cooled until the maximum surface pressure of the foamed molded product fell to 0.001 MPa, thereby yielding a foamed molded product. The density of the obtained foamed molded product was 0.10 g/cm$^3$.

The obtained foamed molded product was measured for fusion rate, dimensional change upon heating, chemical resistance, and penetration impact energy.

The production conditions for Examples 1 to 8 and Comparative Examples 1 to 3, and the measurement results and evaluation results from each of the above tests for the obtained foamed molded products are summarized in Table 1 and Table 2.

TABLE 1

| | | Example | | | | | | | |
|---|---|---|---|---|---|---|---|---|---|
| | | 1 | 2 | 3 | 4 | 5 | 6 | 7 | 8 |
| Production conditions | PP Resin A | 100 parts by weight | 100 parts by weight | 100 parts by weight | 100 parts by weight | — | — | 100 parts by weight | — |
| | PP Resin B | — | — | — | — | 100 parts by weight | 100 parts by weight | — | — |
| | PP Resin C | — | — | — | — | — | — | — | 100 parts by weight |
| | PP/ Styrene monomer | 100/ 233 | 100/ 100 | 100/ 500 | 100/ 43 | 100/ 233 | 100/ 233 | 100/ 233 | 100/ 150 |
| | PP resin melting point (° C.) | 132 | 132 | 132 | 132 | 127 | 127 | 132 | 140 |
| | First polymerization temperature (° C.) | 140 | 140 | 140 | 140 | 140 | 140 | 135 | 135 |
| | Second polymerization | 125 | 125 | 125 | 125 | 125 | 135 | — | 120 |

TABLE 1-continued

|  | Example | | | | | | | |
|---|---|---|---|---|---|---|---|---|
|  | 1 | 2 | 3 | 4 | 5 | 6 | 7 | 8 |
| temperature (° C.) | | | | | | | | |
| Bulk density (g/cm³) | 0.025 | 0.05 | 0.02 | 0.08 | 0.025 | 0.025 | 0.025 | 0.033 |
| Fusion rate (%) | 90 | 85 | 95 | 85 | 90 | 90 | 90 | 90 |
| Dimensional change (%) | ◯ | ◯ | ◯ | ◯ | ◯ | ◯ | ◯ | ◯ |
| Chemical resistance | ◯ | ◯ | Δ | ◯ | ◯ | ◯ | ◯ | ◯ |
| Styrene resin particle longitudinal diameter (μm) | 0.05 to 2.5 | 0.05 to 2.5 | 0.05 to 2.5 | 0.05 to 2.5 | 0.05 to 2.5 | 0.05 to 2.5 | 0.05 to 2.5 | 0.05 to 2.5 |
| Penetration impact energy (J) | 4.02 | 3.99 | 3.9 | 4.08 | 3.95 | 4.04 | 4.04 | 4.00 |

PP Resin A: PC540R, manufactured by SunAllomer Ltd.
PP Resin B: F-794NV, manufactured by Prime Polymer Co., Ltd.
PP Resin C: F-744NP, manufactured by Prime Polymer Co., Ltd.

TABLE 2

| Comparative Example | | 1 | 2 | 3 |
|---|---|---|---|---|
| Production conditions | PP Resin A | 100 parts by weight | 100 parts by weight | — |
|  | PP Resin B | — | — | — |
|  | PP Resin C | — | — | 100 parts by weight |
|  | PP/Styrene monomer | 100/700 | 100/15 | 100/150 |
|  | PP resin melting point (° C.) | 132 | 132 | 140 |
|  | First polymerization temperature (° C.) | 140 | 140 | 125 |
|  | Second polymerization temperature (° C.) | 125 | 125 | 110 |
| Bulk density (g/cm³) | | 0.02 | Did not foam | 0.10 |
| Fusion rate (%) | | 95 | — | 70 |
| Dimensional change (%) | | Δ | — | x |
| Chemical resistance | | x | — | x |
| Styrene resin particle longitudinal diameter (μm) | | 0.05 to 2.5 | — | No islands-in-sea structure |
| Penetration impact energy (J) | | 3.8 | — | 3.7 |

PP Resin A: PC540R, manufactured by SunAllomer Ltd.
PP Resin B: F-794NV, manufactured by Prime Polymer Co., Ltd.
PP Resin C: F-744NP, manufactured by Prime Polymer Co., Ltd.

From the results shown in Table 1 and Table 2 it is evident that the foamed molded products produced in Examples 1 to 7 according to the present invention exhibited superior levels of dimensional change, chemical resistance and penetration impact energy when compared with the foamed molded product produced in Comparative Example 1, which contained an increased proportion of the styrene monomer. Accordingly, the present invention enables the provision of a foamed molded product that remedies the drawbacks associated with polystyrene type resin foamed molded products and polypropylene type resin foamed molded products, and exhibits excellent mechanical properties and chemical resistance and the like.

INDUSTRIAL APPLICABILITY

A styrene-modified polypropylene type resin foamed molded product of the present invention can be used in all manner of applications, including as the core material for vehicle bumpers, vehicle cushioning materials such as the cushioning materials within door panels, electronic components, all manner of industrial materials, and transport containers for foodstuffs and the like. The foamed molded product can be used particularly favorably as a vehicle cushioning material. Accordingly, the present invention is very useful industrially.

The invention claimed is:

1. A styrene-modified polypropylene-based resin particle comprising:
    a polypropylene-based resin having a melting point within a range from 140 to 145° C. and a polystyrene-based resin, wherein
    said polystyrene-based resin is included at 30 parts by weight or more but less than 600 parts by weight per 100 parts by weight of said polypropylene-based resin,
    polystyrene-based resin particles having a longitudinal particle diameter of 5 μm or less are dispersed within said polypropylene-based resin, so as to form an islands-in-sea structure,
    a quantity of said polypropylene-based resin increases near a surface of the styrene-modified polypropylene-based resin particle, and
    a quantity of said polystyrene-based resin increases with increasing proximity to a central portion of the styrene-modified polypropylene-based resin particle,
    such that the polystyrene-based resin particles are unhomogeneously dispersed in the polypropylene-based resin which forms a concentration gradient from the surface towards the central portion of the styrene-modified polypropylene-based resin particle.

2. A foamable styrene-modified polypropylene-based resin particle, prepared by impregnating a styrene-modified polypropylene-based resin particle according to claim 1 with a foaming agent.

3. A styrene-modified polypropylene-based resin foamed particle, obtained by prefoaming a foamable styrene-modified polypropylene-based resin particle according to claim 2.

4. A styrene-modified polypropylene-based resin foamed molded product, prepared by packing a styrene-modified polypropylene-based resin foamed particle according to claim 3 into a molding die and conducting foam molding, wherein said foamed molded product has a density within a range from 0.01 to 0.2 g/cm³.

5. A styrene-modified polypropylene-based resin foamed molded product according to claim 4, wherein a shrinkage factor for said foamed molded product in a dimensional change measurement conducted in accordance with JIS K 6767 under conditions at 90° C is 1.0% or less.

6. A method of producing a styrene-modified polypropylene-based resin particle according to claim 1, comprising:
    dispersing 100 parts by weight of a polypropylene-based resin particle having a melting point of 140 to 145° C, 30 parts by weight or more but less than 600 parts by weight of a styrene-based monomer, and a polymerization initiator within an aqueous suspension containing a dispersant, heating a resulting dispersion to a temperature at which said styrene-based monomer undergoes no substantial polymerization, thereby incorporating said styrene-based monomer within said polypropylene-based resin particle, and performing polymerization of said styrene-based monomer at a temperature within a range from (T−10) to (T+20)° C., wherein T° C. represents a melting point of said polypropylene-based resin particle.

7. A method of producing a styrene-modified polypropylene-based resin particle according to claim 6, wherein said polypropylene-based resin particle is a propylene-ethylene copolymer.

8. A method of producing a foamable styrene-modified polypropylene-based resin particle, wherein following a method of producing a styrene-modified polypropylene-based resin particle according to claim 6, an obtained styrene-modified polypropylene-based resin particle is impregnated with a foaming agent to obtain a foamable styrene-modified polypropylene-based resin particle.

9. A method of producing a styrene-modified polypropylene-based resin foamed particle, wherein following a method of producing a foamable styrene-modified polypropylene-based resin particle according to claim 8, an obtained foamable styrene-modified polypropylene-based resin particle is heated and prefoamed to obtain a foamed particle.

10. A method of producing a styrene-modified polypropylene-based resin foamed molded product, wherein following a method of producing a styrene-modified polypropylene-based resin foamed particle according to claim 9, an obtained styrene-modified polypropylene-based resin foamed particle is packed inside a cavity of a molding die and subsequently subjected to internal foam molding within said molding die, and a molded product is then released from said molding die.

11. A method of producing a styrene-modified polypropylene-based resin particle according to claim 1, comprising:

dispersing 100 parts by weight of a polypropylene-based resin particle having a melting point of 140 to 145° C, 20 parts by weight or more but less than 100 parts by weight of a styrene- based monomer, and a polymerization initiator within an aqueous suspension containing a dispersant, heating a resulting dispersion to a temperature at which said styrene-based monomer undergoes no substantial polymerization, thereby incorporating said styrene-based monomer within said polypropylene-based resin particle, performing a first polymerization of said styrene-based monomer at a temperature within a range from (T−10) to (T+20)° C., wherein T° C. represents a melting point of said polypropylene-based resin particle, and following said first polymerization, adding a styrene-based monomer and a polymerization initiator, and setting a temperature to a value within a range from (T−25) to (T+15)° C., thereby incorporating said styrene-based monomer within said polypropylene-based resin particle and performing a second polymerization (wherein, a total quantity of styrene-based monomer used in said first polymerization and said second polymerization, per 100 parts by weight of said polypropylene-based resin particle, is 30 parts by weight or more but less than 600 parts by weight).

12. A method of producing a styrene-modified polypropylene-based resin particle according to claim 11, wherein said polypropylene-based resin particle is a propylene-ethylene copolymer.

13. A method of producing a foamable styrene-modified polypropylene-based resin particle, wherein following a method of producing a styrene-modified polypropylene-based resin particle according to claim 11, an obtained styrene-modified polypropylene-based resin particle is impregnated with a foaming agent to obtain a foamable styrene-modified polypropylene-based resin particle.

* * * * *